United States Patent
Kim et al.

(10) Patent No.: US 9,414,356 B2
(45) Date of Patent: Aug. 9, 2016

(54) METHOD AND APPARATUS FOR TRANSMITTING/RECEIVING PAGING INFORMATION IN A WIRELESS COMMUNICATION SYSTEM

(75) Inventors: Young-Bum Kim, Seoul (KR); Ju-Ho Lee, Suwon-si (KR); Joon-Young Cho, Suwon-si (KR); Kyeong-In Jeong, Hwosoong-si (KR)

(73) Assignee: Samsung Electronics Co., Ltd (KR)

( * ) Notice: Subject to any disclaimer, the term of this patent is extended or adjusted under 35 U.S.C. 154(b) by 1685 days.

(21) Appl. No.: 11/866,185

(22) Filed: Oct. 2, 2007

(65) Prior Publication Data
US 2008/0081645 A1 Apr. 3, 2008

(30) Foreign Application Priority Data
Oct. 2, 2006 (KR) .......................... 10-2006-0097358

(51) Int. Cl.
*H04W 68/00* (2009.01)
*H04W 68/02* (2009.01)
*H04W 4/00* (2009.01)

(52) U.S. Cl.
CPC .................................. *H04W 68/025* (2013.01)

(58) Field of Classification Search
CPC .............................. H04W 68/00; H04W 38/04
USPC ........................................... 455/458; 370/329
See application file for complete search history.

(56) References Cited

U.S. PATENT DOCUMENTS

| | | | |
|---|---|---|---|
| 7,711,377 B2 * | 5/2010 | Laroia et al. | 455/458 |
| 2002/0077087 A1 * | 6/2002 | Li | H04L 12/189 455/414.1 |
| 2004/0253959 A1 | 12/2004 | Hwang et al. | |
| 2005/0147127 A1 * | 7/2005 | Putcha | H04W 72/005 370/480 |
| 2006/0104225 A1 | 5/2006 | Kim et al. | |
| 2006/0111127 A1 | 5/2006 | Jang | |
| 2006/0142028 A1 | 6/2006 | Kearney et al. | |
| 2007/0259675 A1 * | 11/2007 | Worrall | 455/458 |
| 2009/0010219 A1 * | 1/2009 | Lee et al. | 370/329 |
| 2010/0062795 A1 * | 3/2010 | Lee | 455/458 |

FOREIGN PATENT DOCUMENTS

| | | |
|---|---|---|
| WO | WO 98/54919 | 12/1998 |
| WO | WO 01/54429 | 7/2001 |

OTHER PUBLICATIONS

"PagingxP-002460379,Mechanism in pp.E-UTRAN'" I-4 3GPP TSG-RAN WG2 (Radio) Meeting #54, R2-062128, Aug. 28-Sep. 1.*

* cited by examiner

*Primary Examiner* — Muthuswamy Manoharan
(74) *Attorney, Agent, or Firm* — The Farrell Law Firm, P.C.

(57) ABSTRACT

A method and apparatus for transmitting/receiving paging information in a wireless communication system having a system bandwidth being an integer multiple of a minimum reception bandwidth of a User Equipment (UE), in which a system band is divided into frequency bands having a bandwidth equal to the minimum reception bandwidth of the UE, a Paging Indicator (PI) of the paging information is transmitted in each of the frequency bands, the PI including a group identifier (ID) of a group to which the UE belongs, and a paging message of the paging information is transmitted in one of the frequency bands, the paging message including an ID of the UE.

17 Claims, 6 Drawing Sheets

METHOD AND APPARATUS FOR TRANSMITTING/RECEIVING PAGING INFORMATION IN A WIRELESS COMMUNICATION SYSTEM

PRIORITY

This application claims priority under 35 U.S.C. §119(a) to a Korean Patent Application filed in the Korean Intellectual Property Office on Oct. 2, 2006 and assigned Serial No. 2006-97358, the disclosure of which is hereby incorporated by reference.

BACKGROUND OF THE INVENTION

1. Field of the Invention

The present invention generally relates to a method and apparatus for transmitting/receiving paging information in a wireless communication system. More particularly, the present invention relates to a method and apparatus for transmitting/receiving paging information in a cellular system supporting scalable bandwidth.

2. Description of the Related Art

Universal Mobile Telecommunication System (UMTS) is a $3^{rd}$ Generation (3G) asynchronous Wideband Code Division Multiple Access (WCDMA) mobile communication system based on European mobile communication systems, Global System for Mobile Communications (GSM) and General Packet Radio Services (GPRS).

The $3^{rd}$ Generation Partnership Project (3GPP) group working on UMTS standardization is considering Long Term Evolution (LTE) for future-generation mobile communications. LTE is a technology for realizing high-speed packet communications at or above 100 Mbps (Megabits per second). For radio access in an LTE system, Orthogonal Frequency Division Multiplexing (OFDM) is under active discussion as promising for high-speed data transmission.

Due to orthogonality between subcarriers, OFDM offers optimal transmission efficiency in high-speed data transmission. Also, overlapped frequency spectrum leads to good frequency use efficiency and robustness against multipath fading contributes to the optimal transmission efficiency of high-speed data transmission.

One significant feature of an OFDM cellular wireless communication system that provides high-speed data service is to support scalable bandwidth. A bandwidth-scalable system can have a variety of frequency bandwidths, for example, 20, 15, 10, 5, 2.5, and 1.25 MHz (MegaHertz). Service providers can select one of the bandwidths for each cell to provide services, and there may exist User Equipments (UEs) that support different bandwidths ranging from 1.25 MHz to 20 MHz.

In a bandwidth-scalable system, a UE should succeed in a cell search without knowledge of a system bandwidth during an initial access to the system. The UE acquires synchronization between a transmitter and a receiver and a cell identifier (ID) by a cell search in order to demodulate data and control information. The system bandwidth is known from a Synchronization CHannel (SCH) signal during the cell search or by demodulating a Broadcasting CHannel (BCH) that is a shared control channel carrying system information about the cell after the cell search. The BCH is the first channel that the MS demodulates after the cell search. The MS performs the cell search by the SCH signal and acquires the system information about the cell by receiving the BCH signal after a successful cell search in the cell. The system information is used for receiving data channels and control channels, such as the cell ID, the system bandwidth, channel setup information, etc.

The cellular wireless communication system uses a Paging CHannel (PCH) to page an idle-state UE and establish a connection to the UE. In the presence of paging information for the UE in the PCH signal, the UE starts a connection setup procedure with the system. The PCH signal can include Paging Indicators (PIs) and paging messages. Each PI is composed of a group ID identifying a group to which the UE belongs and scheduling information indicating resources in which a paging message directed to the UE is transmitted. The group ID is a representative of the IDs of a plurality of UEs. The paging message includes the ID of the UE to be paged within the group indicated by the PI and information indicating the purpose of paging. The idle-state UE wakes up every period to monitor the presence or absence of transmission information from a Node B (or Base Station (BS)) in order to save power. This is called Discontinuous Reception (DRX). That is, the idle-state UE wakes up every DRX period, receives a PCH signal, and detects a group ID in a PI. The UE receives a paging message when the group ID is identical to that of the group to which the UE belongs. When the group IDs are different, the UE is kept in the idle state until the next DRX period. When a UE ID included in the paging message is identical to that of the UE, the UE detects the purpose of the paging and performs a reception operation corresponding to the system paging. When the paging message does not include the ID of the UE, the UE is kept in the idle state until the next DRX period. This paging procedure and DRX operation reduces unnecessary power consumption of the UE.

The bandwidth-scalable system differs from a legacy system in that UEs have different bandwidth capabilities. Therefore, a significant task that the bandwidth-scalable system has to deal with in using the PCH is that a UE having a less bandwidth than a system bandwidth should be able to receive the PCH signal reliably even when the UE receives a service in part of the system bandwidth.

Figure 1:
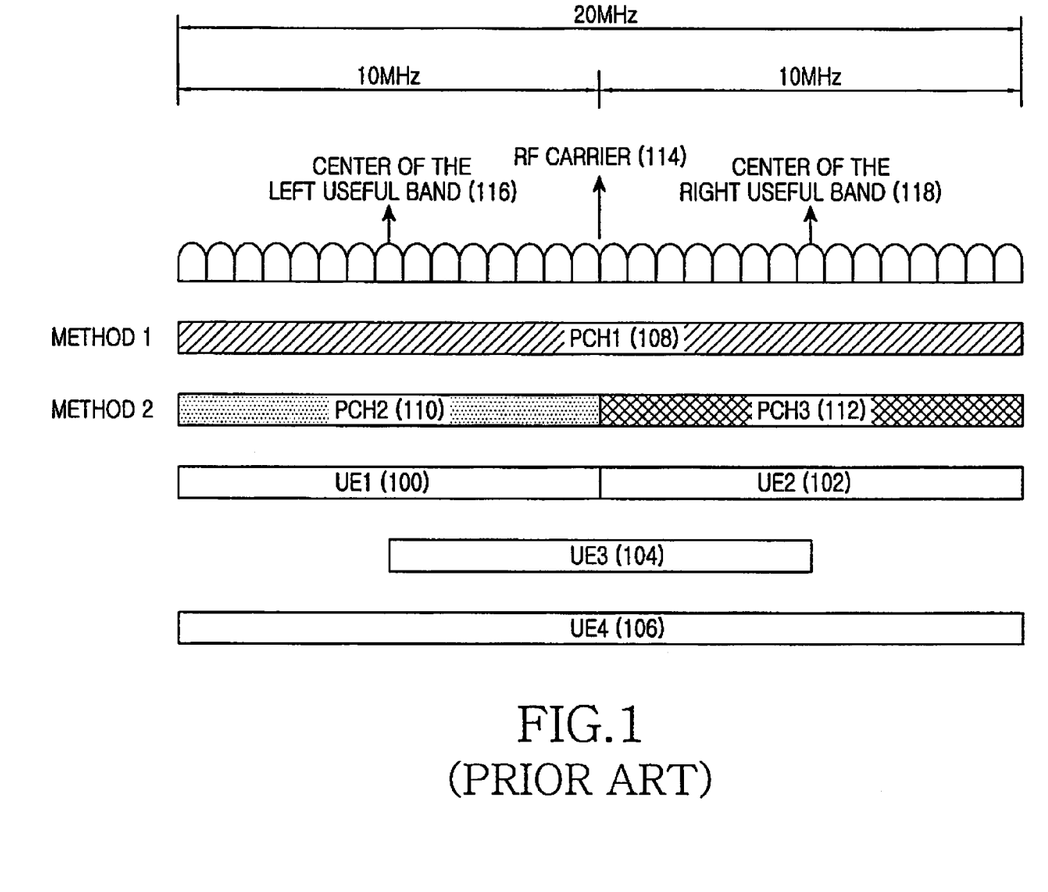
FIG. 1 illustrates a conventional PCH configuration in a bandwidth-scalable system.

FIG. 1 a conventional example of idle-state UEs to which reception bandwidths of 10 MHz and 20 MHz are allocated in a 20-MHz system band.

Referring to FIG. 1, first, second and third UEs 100, 102 and 104 (UE1, UE2 and UE3) each having a minimum reception bandwidth of 10 MHz co-exist with a fourth UE 106 (UE4) having a minimum reception bandwidth of 20 MHz in the system with the 20-MHz bandwidth. In this case, a PCH signal is transmitted across the total 20-MHz system band, referred to herein as Method 1, or across different 10-MHz bands, referred to herein as Method 2.

Method 1 is not viable for UE1 because a first PCH signal (PCH1) is transmitted in the 20-MHz band wider than the reception band of UE1. Since the center Radio Frequency (RF) frequency 116 of UE1 is set in the left 10-MHz band, UE1 can receive a second PCH signal 110 (PCH2) in this band.

Similarly, for UE2, the center RF frequency 118 of UE2 is set in the left 10-MHz band and thus UE2 can receive a third PCH signal 112 (PCH3) in this band. As a result, the system has to transmit PCH2 and the PCH3 redundantly in the two 10-MHz bands in order to support UE1 and UE2 simultaneously, thereby increasing overhead.

The center RF frequency of UE3 is set to the center 114 of the 20-MHz band. Method 1 is not viable for UE3 because the transmission band of PCH1 is beyond the reception band of UE3. Even though UE3 receives PCH2 110 or PCH3 in Method 2, UE3 cannot carry out a paging procedure normally because the reception is possible only in part of each of the transmission bands of PCH2 and PCH3.

UE4 with 20 MHz as a minimum reception bandwidth can receive PCH1, PCH2 and PCH3 in Method 1 or Method 2 because the 20-MHz band covers the transmission bands of PCH1, PCH2 and PCH3.

Accordingly, there exists a need for developing a method for enabling reliable PCH reception in a UE with a bandwidth less than a 20-MHz system bandwidth when the UE receives a service in part of a system band in a bandwidth-scalable system.

SUMMARY OF THE INVENTION

The present invention addresses at least the above-described problems and/or disadvantages and provides at least the advantages described below. Accordingly, an aspect of the present invention is to provide a method and apparatus for transmitting/receiving a PCH signal so a UE can receive paging information reliably in a bandwidth-scalable system.

In accordance with an aspect of the present invention, there is provided a method for transmitting/receiving paging information to a UE in a wireless communication system having a system bandwidth being an integer multiple of a minimum reception bandwidth of the UE, in which a system band is divided into frequency bands having a bandwidth equal to the minimum reception bandwidth of the UE, a PI of the paging information is transmitted in each of the frequency bands, the PI including a group ID of a group to which the UE belongs, and a paging message of the paging information is transmitted in one of the frequency bands, the paging message including an ID of the UE.

In accordance with another aspect of the present invention, there is provided a method for receiving paging information in a UE in a wireless communication system having a system bandwidth being an integer multiple of a minimum reception bandwidth of the UE, in which the UE receives the paging information every period, detects a PI in the paging information, compares a group ID included in the PI with a group ID of the UE, determines a frequency band on which the UE is currently camped when the group IDs are identical, receives a paging message in one of frequency bands having a bandwidth equal to the minimum reception bandwidth of the UE when the determined frequency band is the one frequency band carrying the paging message, changes to the one frequency band and receives the paging message in the one frequency band when the determined frequency band is not the one frequency band carrying the paging message, and compares a UE ID set in the paging message with an ID of the UE and determines that the system has paged the UE when the UE IDs are identical.

In accordance with a further aspect of the present invention, there is provided an apparatus for transmitting paging information to a UE in a wireless communication system having a system bandwidth being an integer multiple of a minimum reception bandwidth of the UE, in which a channel encoder channel-encodes the paging information, a mapper maps a PI of the encoded paging information to all frequency bands having a bandwidth equal to the minimum reception bandwidth of the UE and maps a paging message of the encoded paging information to one of the frequency bands, a controller provides the PI and the paging message to the channel encoder and determines the one frequency band to which the paging message is mapped, and a converter converts the mapped PI and the mapped paging message to a time-domain signal and transmits the time-domain signal.

In accordance with still another aspect of the present invention, there is provided an apparatus for receiving paging information in a UE in a wireless communication system having a system bandwidth being an integer multiple of a minimum reception bandwidth of the UE, in which a receiver receives a signal in a frequency band among frequency bands having a bandwidth equal to the minimum reception bandwidth of the UE, a demapper extracts a PI and a paging message from the received signal, a decoder decodes the PI and the paging message, a frequency controller controls a reception frequency band so as to receive the paging message, and a reception controller controls the frequency controller to change the reception frequency band to a frequency band carrying the paging message when the reception frequency band is different from the frequency band carrying the paging message.

BRIEF DESCRIPTION OF THE DRAWINGS

The above and other objects, features and advantages of certain preferred embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF THE PREFERRED EMBODIMENTS

The matters defined in the description such as a detailed construction and elements are provided to assist in a comprehensive understanding of preferred embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

While the present invention is described in the context of an Orthogonal Frequency Division Multiplexing (OFDM) system, those skilled in the art should clearly understand that a paging information transmission/reception method of the present invention is applicable to other communication systems having a similar technological background and channel structure with a slight modification made to the present invention.

Preferred embodiments of the present invention provide a Paging CHannel (PCH) structure supporting scalable bandwidth so an idle-state User Equipment (UE) can receive paging information. Preferred embodiments of the present invention also provide a technology for reducing PCH overhead, while decreasing the receiver complexity of a UE.

The main feature of the present invention lies in that information included in a PCH signal is divided into a Paging Indicator (PI) and a paging message and the PI and the paging message are mapped to two different frequency areas in order to support scalable bandwidth. The PI is composed of a group identifier (ID) identifying a group to which a UE to be paged belongs, and scheduling information indicating resources in which the paging message is transmitted. The group ID is a representative of the IDs of a plurality of UEs. The paging message includes the ID of the UE to be paged by a system within the group indicated by the PI and information about the purpose of the paging.

Figure 2:
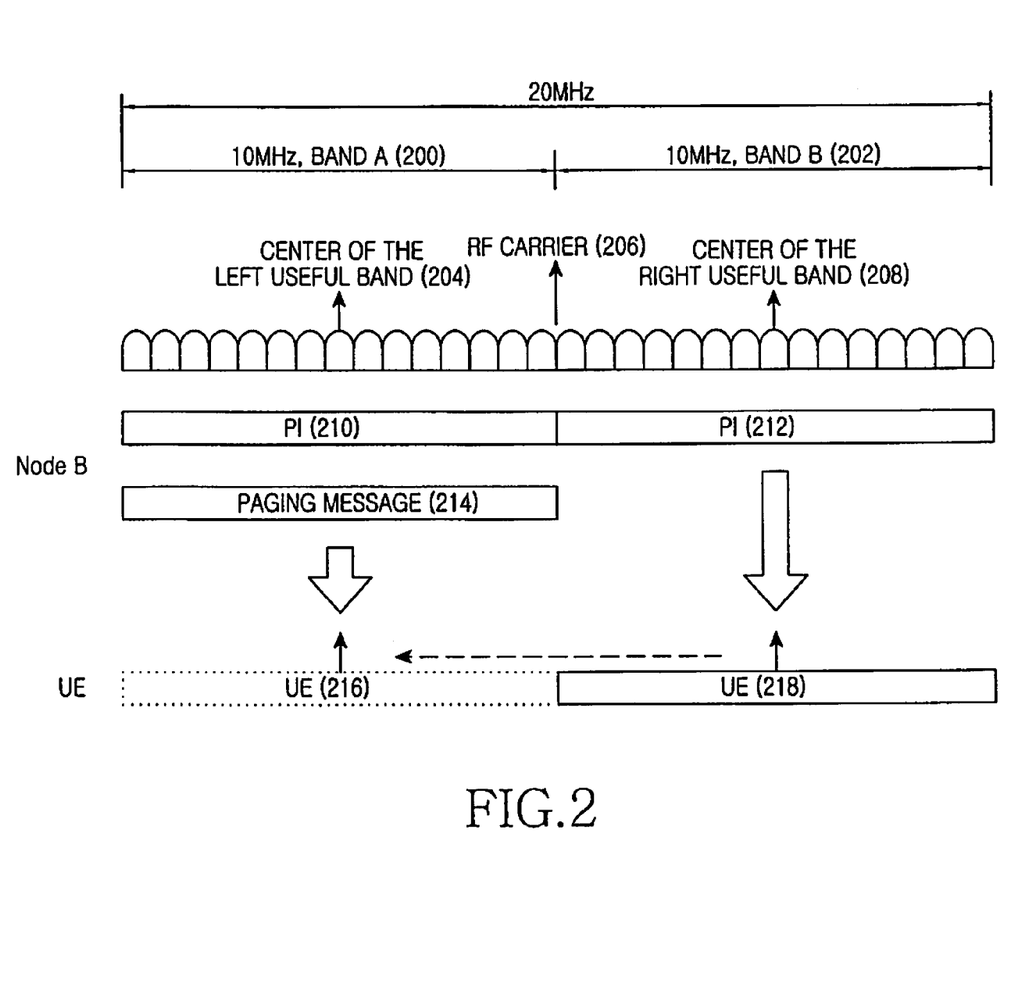
FIG. 2 illustrates a PCH configuration method according to an embodiment of the present invention.
Figure 3:
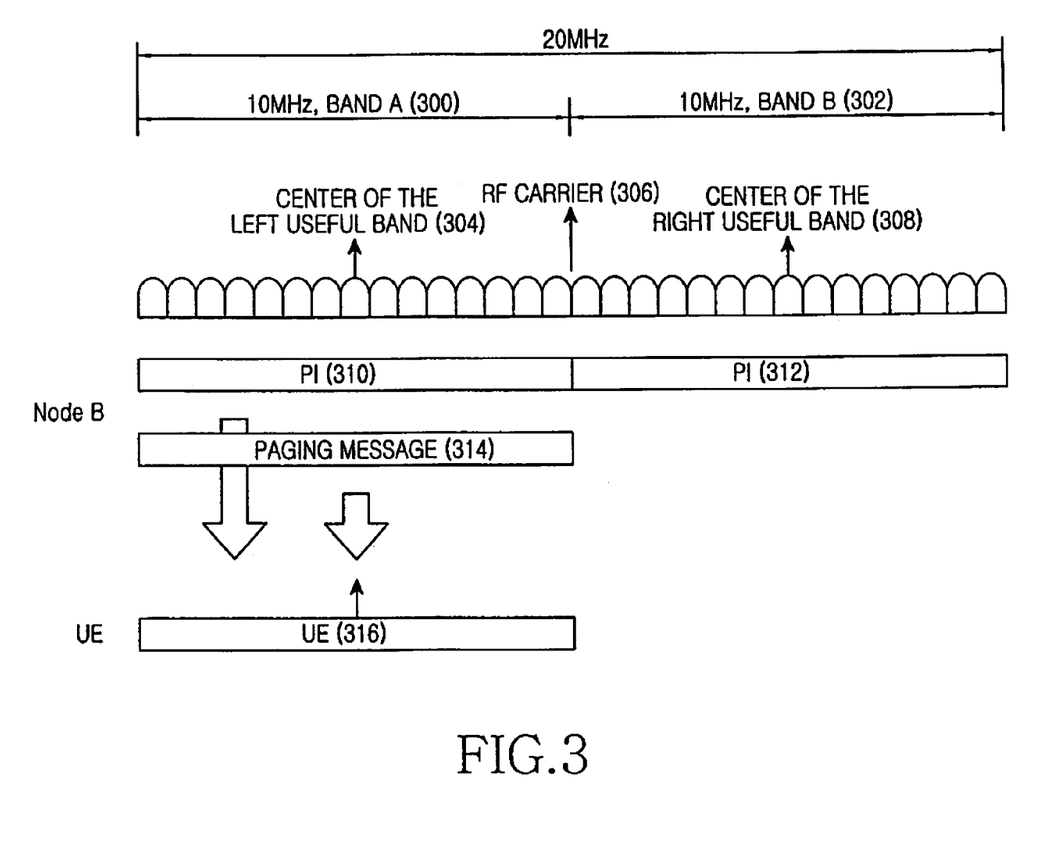
FIG. 3 illustrates a PCH configuration method according to another embodiment of the present invention.

With reference to FIGS. 2 and 3, the subject matter of the present invention will be described below.

FIG. 2 shows an example of a PCH configuration method according to the present invention. In FIG. 1, a PCH signal is transmitted to a UE with a minimum bandwidth of 10 MHz in a system with a transmission bandwidth of 20 MHz.

Referring to FIG. 2, left and right 10-MHz bands 200 and 202 of the total 20-MHz band are referred to as band A and band B, respectively. A UE 218 with a center Radio Frequency (RF) frequency of the UE 218 set to the center 208 of band B receives a signal from a Node B in band B. The UE 218 is now in idle state and wakes up every Discontinuous Reception (DRX) period, for signal reception. To support UEs with a minimum bandwidth of 10 MHz, the Node B transmits PIs 210 and 212 redundantly in band A and band B so the 10-MHz UEs can receive either of the PIs 210 and 212 irrespective of whether they are camped on band A or band B. Paging message conditions are preset between the Node B and UEs by system information so a paging message 214 is transmitted only in band A, to thereby minimize the overhead of paging message transmission.

The UE 218 that is currently camped on band B wakes up from the idle state, receives the PI 212 from the Node B, and compares a group ID set in the PI 212 with the group ID of the UE 218. If the group IDs are different, the UE 218 is kept in the idle state. If the group IDs are identical, the UE 218 is aware that the UE 218 is to receive the paging message 214 and detects scheduling information about the paging message 214 in the PI 212. With prior knowledge of transmission of the paging message 214 in band A, the UE 218 sets the center RF frequency of the UE 218 to the center 204 of band A and receives the paging message 214 in band A. To compensate for a time delay involved in the center frequency transitioning, the PI 212 is set to be transmitted in band B earlier than the PI 210 in band A by a particular time. As a consequence, no time delay occurs in receiving the paging message 214 in band A. After the center RF frequency transitioning, the UE 218, i.e. the UE 216 finds out radio resources in which the paging message 214 is carried from the scheduling information set in the PI 212. The UE 216 compares the ID of the UE 216 with a UE ID set in the paging message 214. If the UE IDs are different, the UE 216 transitions to the idle state. If the UE IDs are identical, the UE 216 acquires information about the purpose of the paging, considering that the system has paged the UE 216, and then ends the paging procedure.

FIG. 3 shows another example of a PCH configuration method according to the present invention. In FIG. 3, a UE with a minimum bandwidth of 10 MHz is camped on a 10-MHz band in a system having a transmission bandwidth of 20 MHz.

Referring to FIG. 3, to support UEs with a minimum bandwidth of 10 MHz, the Node B transmits PIs 310 and 312 redundantly in bands 300 and 302 (band A and band B) and agrees with the UEs by system information that a paging message 314 is transmitted only in band A, as in FIG. 2. The PIs 310 and 312 each include the group ID and UE ID of the UE 316. The UE 316 that is currently camped on band A wakes up from the idle state, receives the PI 310 from the Node B in band A, and compares a group ID set in the PI 312 with the group ID of the UE 316. If the group IDs are identical, the UE 316 is aware that the UE 316 is to receive the paging message 314 and detects scheduling information about the paging message 314 in the PI 310. With prior knowledge of transmission of the paging message 314 in band A, the UE 316 receives the paging message 314, while maintaining its center frequency. The UE 316 can identify resources that carry the paging message 314 from the scheduling information about the paging message 314 in the PI 310. Upon receipt of the paging message 314, the UE 316 compares the ID of the UE 316 with a UE ID set in the paging message 314. If the UE IDs are identical, the UE 316 acquires information about the purpose of the paging, considering that the system has paged the UE 216, and then ends the paging procedure.

The paging channel structure and the paging procedure that support scalable bandwidth according to the present invention are summarized as follows.

(1) A band in which a paging message is transmitted is preset.

(2) A PI is repeatedly transmitted in bands each of which has a bandwidth equal to the minimum bandwidth of UEs.

(3) A PI is transmitted in a band other than the band with the paging message earlier than a PI in the band with the paging message by a timing offset.

In this manner, the transmission overhead of a paging message is reduced and the UE 316 does not need to change the center RF frequency of the UE 316. The resulting minimization of center RF frequency changes reduces the reception complexity of the UE 316.

The present invention is described below in greater detail. A system bandwidth is assumed to be 20 MHz and the minimum allowed reception bandwidth of UEs assumed to be 10 MHz.

Figure 4:
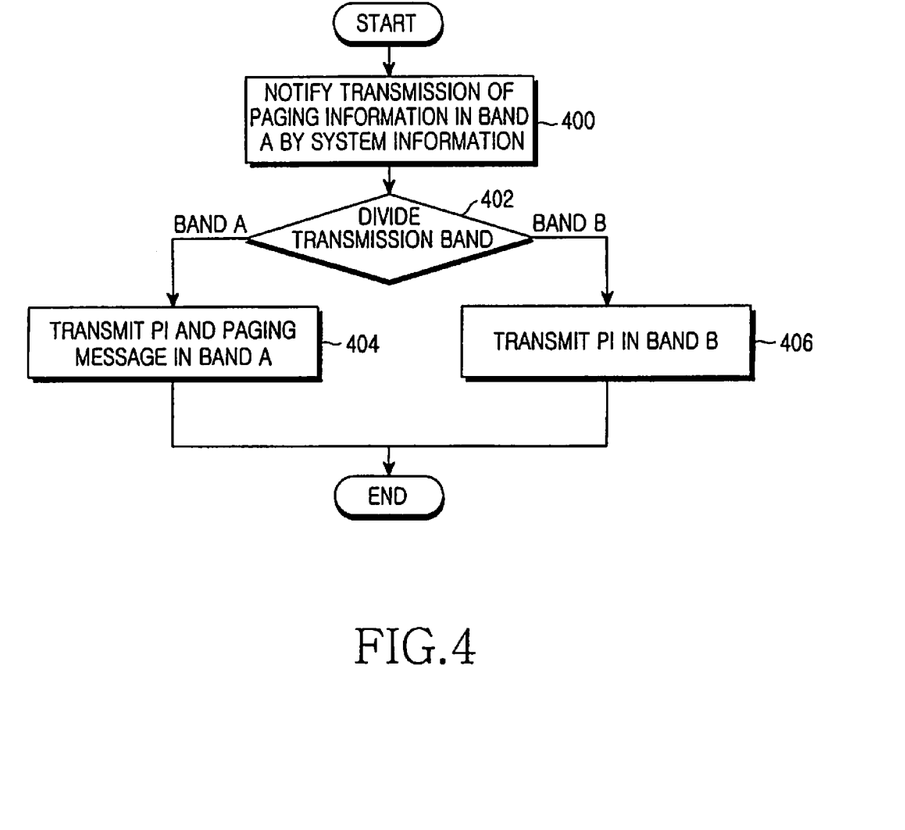
FIG. 4 is a flowchart of a transmission operation of a Node B according to the present invention.

FIG. 4 shows a transmission operation of the Node B according to the present invention.

In FIG. 4, the Node B presets a band in which a paging message is to be transmitted and notifies a UE of the band by system information beforehand in step 400. The band with the paging message is referred to herein as band A and any other band is referred to as band B for convenience. The system information can be transmitted on a BCH. Alternatively, band A can be fixed by agreement between the Node B and the UE.

The Node B divides the transmission band into band A and band B to transmit paging information. The Node B transmits paging information including a PI and a paging message in band A in step 404 and transmits paging information including the PI only in band B in step 406. The PI of band A is earlier than the PI of band B by a timing offset in order to compensate for a time delay involved in a center RF frequency change. The timing offset is preset or notified to the UE by system information so the UE can adjust the UE reception timing of the paging message.

The PIs transmitted in band A and band B may include the same information or different information. In the former case, since the transmission format of the PIs is constant, the receiver complexity of the UE is reduced. Also, since a UE camped on band B has prior knowledge of transmission of a paging message in band A, upon receipt of scheduling information about the paging message from the PI, the UE interprets the scheduling information in terms of band A. If the PIs include the same information, they may include a group ID and scheduling information about a paging message. Further, they may include information about the frequency band in which the paging message is transmitted. In this case, there is no need for notifying the UE of the frequency band carrying the paging message by system information, thereby enabling more flexible radio resource management. Also, overload that may result from transmission of a paging message in a fixed frequency band can be distributed. That is, the paging message can be transmitted in either of band A and band B according to a UE. The UE can find out the band with the paging message by checking an indicator indicating a paging message transmission band included in a PI.

Figure 5:
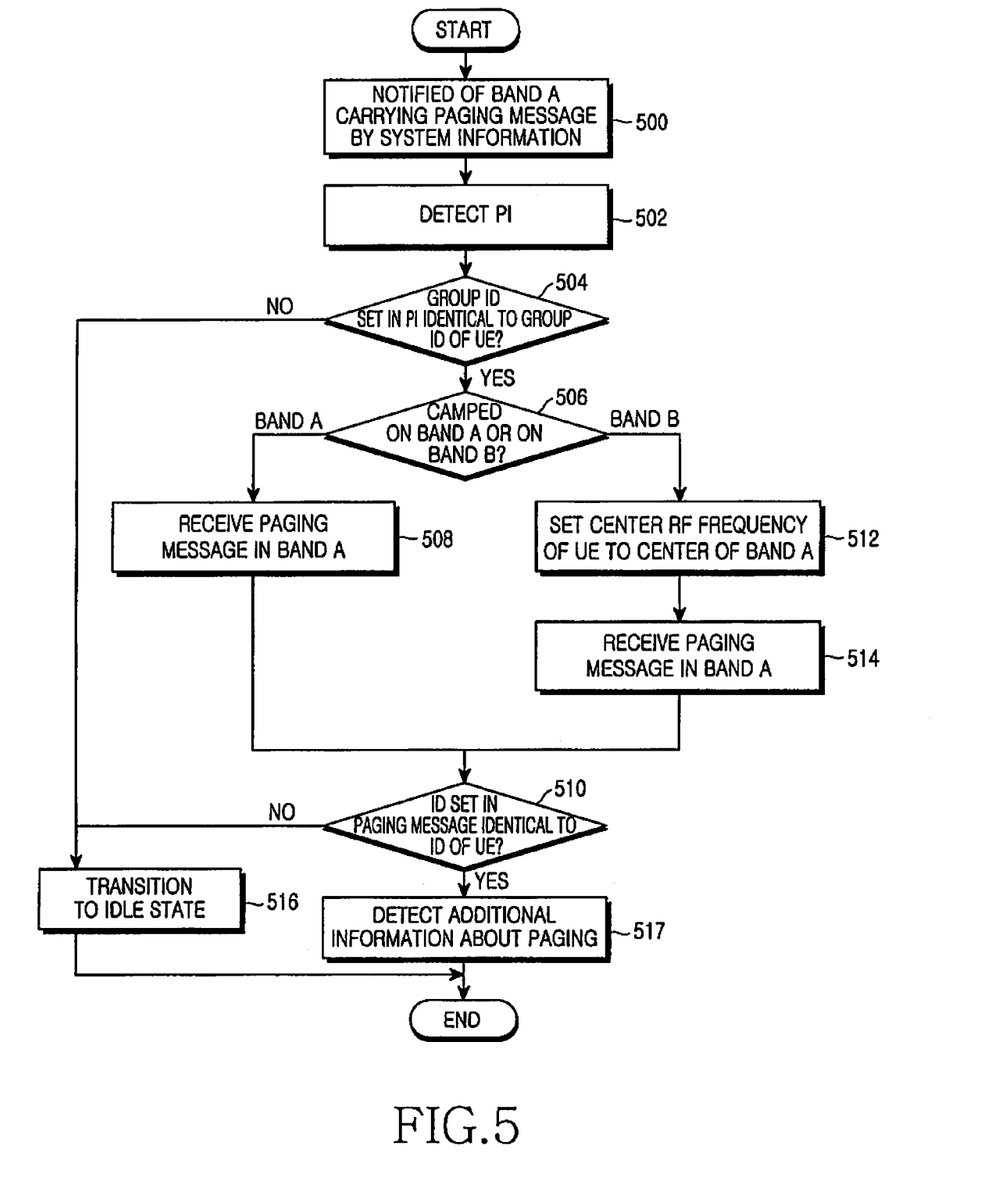
FIG. 5 is a flowchart of a reception operation of a UE according to the present invention.

FIG. 5 shows a reception operation of the UE according to the present invention.

In FIG. 5, the UE is aware of a band carrying a paging message (band A) by system information in step 500. The UE is now in idle state and wakes up every DRX period to receive paging information. The UE detects a PI in the received paging information in step 502 and compares a group ID set in the PI with the group ID of the UE in step 504. If the group IDs are different, the UE transitions to the idle state in step 516 and ends the paging procedure. If the group IDs are identical, the UE determines whether the UE is camped on band A or band B in step 506 and performs a paging operation accordingly. That is, if the UE is camped on band A, the UE receives a paging message in band A using scheduling information about the paging message included in the PI in step 508 and compares a UE ID included in the paging message with its ID in step 510. If the UE IDs are identical, the UE considers that the system has paged the UE and finds out the purpose of the paging in step 517 and then ends the paging procedure. If the UE IDs are different, the UE sets the state of the UE to the idle state in step 516 and ends the paging procedure.

On the other hand, when the UE is camped on band B, the UE changes the RF frequency of the UE to the center of band A in step 512 and receives a paging message in band A using scheduling information about the paging message included in the PI in step 514. The UE compares a UE ID included in the paging message with the ID of the UE in step 510. If the UE IDs are identical, the UE considers that the system has paged the UE and finds out the purpose of the paging in step 517 and then ends the paging procedure. If the UE IDs are different, the UE sets the state of the UE to the idle state in step 516 and ends the paging procedure.

As to the DRX periods of UEs, a UE camped on band B is set to wake up from the idle state earlier than a UE camped on band A by a timing offset, such that the UE of band B can receive in time a PI transmitted in band B earlier than the PI of band A by the timing offset. The timing offset can be notified to the UEs by system information.

Figure 6:
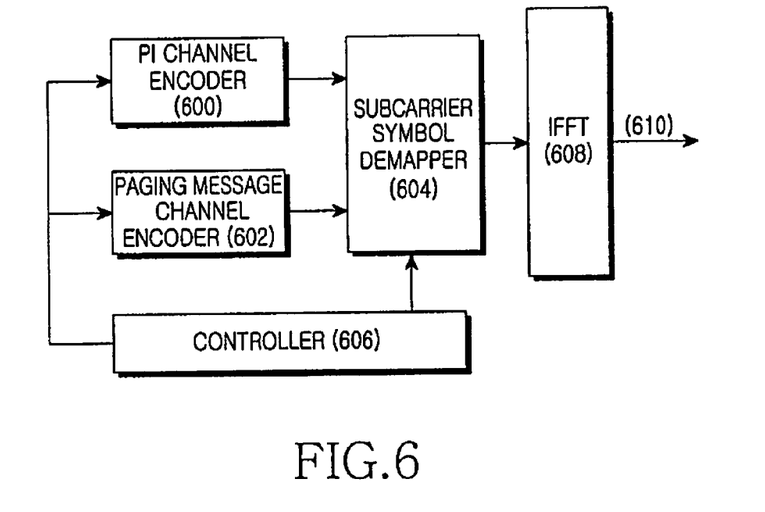
FIG. 6 is a block diagram of a transmitter of the Node B according to the present invention.

FIG. 6 shows a transmitter of the Node B according to the present invention.

Referring to FIG. 6, a PI channel encoder 600 channel-encodes a PI and a paging message channel encoder 602 channel-encodes a paging message. For example, for band A, both the PI and the paging message are channel-encoded together, and for band B, only the PI is channel-encoded. A subcarrier symbol mapper 604 maps the code symbols received from the PI channel encoder 600 and the paging message channel encoder 602 to frequency bands in which paging information is to be transmitted. An Inverse Fast Fourier Transform (IFFT) processor 608 converts the mapped signal to a time-domain OFDM signal 610. If a system bandwidth is 20 MHz, the subcarrier symbols of the PI are mapped to IFFT input tabs corresponding to two 10-MHz bands, and the subcarrier symbols of the paging message are mapped to IFFT input tabs corresponding to one of the 10-MHz bands (i.e. band A). The mapping is performed under the control of a controller 606. That is, the controller 606 provides the PI and the paging message to the PI channel encoder 600 and the paging message channel encoder 602, respectively. The controller 606 also decides the mapping positions of the subcarrier symbols of the paging information and controls the subcarrier symbol mapper 604 according to the decision.

Figure 7:
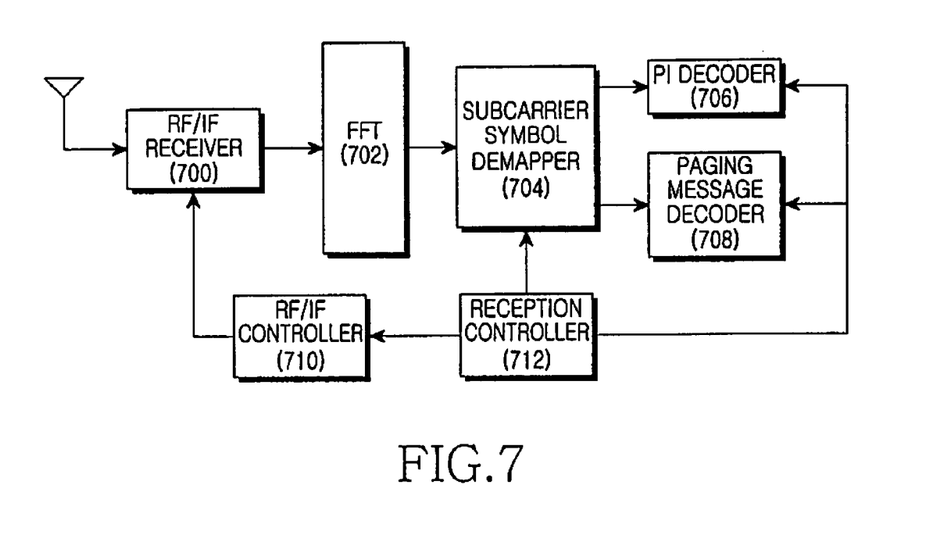
FIG. 7 is a block diagram of a receiver of the UE according to the present invention.

FIG. 7 shows a paging information receiver of the UE according to the present invention.

Referring to FIG. 7, an RF/Intermediate Frequency (IF) receiver 700 receives a signal in an intended band by adjusting a reception bandwidth and a reception RF frequency under the control of an RF/IF controller 710. A Fast Fourier Transform (FFT) processor 702 converts the received signal to subcarrier symbols. A subcarrier symbol demapper 704 selects subcarrier symbols of a PI and a paging message from among the subcarrier symbols according to a PI and paging message symbol mapping rule for the reception band. A reception controller 712 controls the RF/IF controller 710 according to the system bandwidth and the reception timings of the paging information. The reception controller 712 also controls appropriate input of the demapped subcarrier symbols to a PI decoder 706 and a paging message decoder 708, and controls the decoders 706 and 708 to decode the subcarrier symbols in channel coding formats applied to the PI and the paging message. The PI decoder 706 and the paging message decoder 708 acquire the paging information by decoding the subcarrier symbols.

As is apparent from the above description, when a UE with a reception bandwidth less than a system bandwidth wakes up from idle state and receives paging information from a Node B, the present invention advantageously reduces the reception complexity of the UE and the transmission overhead of paging information from the Node B.

While the invention has been shown and described with reference to certain preferred embodiments of the present invention thereof, it will be understood by those skilled in the art that various changes in form and details may be made therein without departing from the spirit and scope of the present invention as defined by the appended claims and their equivalents.

What is claimed is:

1. A method for transmitting paging information to a user equipment (UE) in a wireless communication system having a plurality of frequency bands, the method comprising:
   transmitting, to the UE camped in a first frequency band, system information that comprises information of a second frequency band carrying a paging message for the UE;
   transmitting, to the UE, a paging indicator (PI) including a group identifier (ID) both in the first frequency band and in the second frequency band, after transmitting the system information; and
   transmitting, to the UE, the paging message only in the second frequency band,
   wherein the PI is transmitted in the first frequency band earlier than in the second frequency band by a timing offset.

2. The method of claim 1, wherein the PI further includes scheduling information about the paging message.

3. The method of claim 1, wherein the information of the second frequency band is transmitted so that the UE receives the paging message in the second frequency band.

4. The method of claim 1, wherein the first frequency band and the second frequency band have a bandwidth equal to a minimum reception bandwidth of the UE.

5. A method for receiving paging information in a user equipment (UE) in a wireless communication system having a plurality of frequency bands, the method comprising:
   camping on a first frequency band;
   receiving, at the UE camped in a first frequency band, system information comprising information of a second frequency band carrying a paging message;
   receiving, at the UE, a paging indicator (PI) including a group identifier (ID) transmitted both in the first frequency band and in the second frequency band, after receiving the system information;
   determining, by the UE, whether to receive the paging message based on the group ID;
   determining, by the UE, whether the first frequency band is different from the second frequency band if it is determined to receive the paging message;
   changing the camped first frequency band to the second frequency band if the first frequency band is different from the second frequency band; and
   receiving, at the UE, the paging message only in the second frequency band,
   wherein the PI is transmitted in the first frequency band earlier than in the second frequency band by a timing offset.

6. The method of claim 5, wherein the PI further includes scheduling information about the paging message.

7. The method of claim 5, further comprising comparing the group ID included in the PI with a group ID of the UE and determining the frequency band on which the UE is currently camped when the group IDs are identical.

8. The method of claim 5, wherein the first frequency band and the second frequency band have a bandwidth equal to a minimum reception bandwidth of the UE.

9. An apparatus for transmitting paging information to a user equipment (UE) in a wireless communication system having a plurality of frequency bands, the apparatus comprising:
   a channel encoder configured to channel-encode information of a second frequency band carrying a paging message for a UE camped in a first frequency band;
   a mapper configured to map a paging indicator (PI) including a group identifier (ID) both in the first frequency band and in the second frequency band, and map the paging message only to the second frequency band;
   a controller configured to provide the PI and the paging message to the channel encoder and determining one frequency band to which the paging message is mapped; and
   a converter configured to convert the mapped PI and the mapped paging message to a time-domain signals and transmit the time-domain signals,
   wherein the information of the second frequency band is transmitted as system information to the UE,
   wherein the time-domain signals are transmitted after transmitting the system information, and
   wherein the PI is transmitted in the first frequency band earlier than in the second frequency band by a timing offset.

10. The apparatus of claim 9, wherein the PI further includes scheduling information about the paging message.

11. The apparatus of claim 9, wherein the information of a second frequency band is transmitted so that the UE receives the paging message in the second frequency band.

12. The apparatus of claim 9, wherein the first frequency band and the second frequency band have a bandwidth equal to a minimum reception bandwidth of the UE.

13. An apparatus for receiving paging information in a user equipment (UE) in a wireless communication system having a plurality of frequency bands, the apparatus comprising:
   a receiver receiving system information comprising information of a second frequency band carrying a paging message, a paging indicator (PI) including a group identifier (ID) transmitted both in a first frequency band and in the second frequency band, after receiving the system information, and the paging message transmitted only in the second frequency band;
   a demapper configured to extract the PI and the paging message from the received signal;
   a decoder configured to decode the PI and the paging message;
   a frequency controller configured to control a reception frequency band to receive the paging message;
   a reception controller configured to determine whether to receive the paging message based on the group ID, determine whether the first frequency band is different from the second frequency band if it is determined to receive the paging message, and change a camped frequency band from the first frequency band to the second frequency band if the first frequency band is different from the second frequency band,
   wherein the PI is transmitted in the first frequency band earlier than in the second frequency band by a timing offset.

14. The apparatus of claim 13, wherein the reception controller is further configured to compare the group ID included in the PI with a group ID of the UE and determines a frequency band on which the UE is currently camped on when the group IDs are identical.

15. The apparatus of claim 13, wherein the PI further includes scheduling information about the paging message.

16. The apparatus of claim 13, wherein the reception controller is further configured to compare the group identifier (ID) included in the PI with a group ID of the UE and determines a frequency band on which the UE is currently camped when the group IDs are identical.

17. The apparatus of claim 13, wherein the first frequency band and the second frequency band have a bandwidth equal to a minimum reception bandwidth of the UE.

* * * * *